(12) United States Patent
Mendenhall

(10) Patent No.: US 7,823,974 B2
(45) Date of Patent: Nov. 2, 2010

(54) LOCK FOR FORWARD-FOLDING BACKREST

(75) Inventor: Andrew B. Mendenhall, Mooresville, IN (US)

(73) Assignee: Cosco Management, Inc., Wilmington, DE (US)

( * ) Notice: Subject to any disclaimer, the term of this patent is extended or adjusted under 35 U.S.C. 154(b) by 116 days.

(21) Appl. No.: 12/036,989

(22) Filed: Feb. 25, 2008

(65) Prior Publication Data

US 2008/0224512 A1 Sep. 18, 2008

Related U.S. Application Data

(60) Provisional application No. 60/894,616, filed on Mar. 13, 2007.

(51) Int. Cl.
A47C 1/10 (2006.01)
B60N 2/02 (2006.01)

(52) U.S. Cl. .................. 297/255; 297/101; 297/354.13; 297/256.1

(58) Field of Classification Search .................. 297/255, 297/256.1, 124, 354.13, 101, 102
See application file for complete search history.

(56) References Cited

U.S. PATENT DOCUMENTS

| | | | |
|---|---|---|---|
| 1,641,953 A | 9/1927 | Abraham | |
| 1,742,822 A | 1/1930 | Olson | |
| 3,762,768 A | 10/1973 | Hyde et al. | |
| 4,382,629 A * | 5/1983 | Froumajou | 297/322 |
| 4,986,600 A | 1/1991 | Leblanc et al. | |
| 5,121,965 A * | 6/1992 | Skold et al. | 297/256.1 |
| 5,123,377 A * | 6/1992 | Edwards | 119/28.5 |
| 5,496,092 A | 3/1996 | Williams et al. | |
| 5,499,860 A | 3/1996 | Smith et al. | |
| 5,647,634 A | 7/1997 | Presser et al. | |
| 5,785,383 A | 7/1998 | Otero | |
| 5,803,543 A | 9/1998 | Hartmann | |
| 6,179,362 B1 | 1/2001 | Wisniewski et al. | |
| 6,767,058 B2 | 7/2004 | McClellan-Derrickson | |
| 6,773,064 B2 | 8/2004 | Treen et al. | |
| 6,817,670 B2 * | 11/2004 | Macey | 297/378.1 |
| 6,840,577 B2 | 1/2005 | Watkins | |
| 6,908,151 B2 | 6/2005 | Meeker et al. | |
| 6,932,429 B2 | 8/2005 | Kamiki | |
| 6,981,741 B2 * | 1/2006 | Sirjoo | 297/354.13 |
| 7,000,985 B2 | 2/2006 | Belgarde | |
| 7,267,406 B2 * | 9/2007 | Sturt | 297/378.12 |
| 7,419,218 B2 * | 9/2008 | Holdampf et al. | 297/378.12 |
| 7,625,043 B2 | 12/2009 | Hartenstine et al. | |
| 2004/0061366 A1 | 4/2004 | Meeker et al. | |
| 2004/0124677 A1 | 7/2004 | Meeker et al. | |
| 2005/0052059 A1 | 3/2005 | Oto | |
| 2005/0186068 A1 | 8/2005 | Coulson et al. | |
| 2005/0264059 A1 | 12/2005 | Clement et al. | |
| 2005/0264065 A1 | 12/2005 | Clement et al. | |
| 2006/0006712 A1 | 1/2006 | Clement et al. | |
| 2006/0012234 A1 | 1/2006 | Collias | |
| 2006/0138823 A1 | 6/2006 | Huang | |
| 2006/0138848 A1 * | 6/2006 | Balensiefer et al. | 297/440.16 |
| 2007/0236061 A1 | 10/2007 | Meeker et al. | |
| 2009/0189429 A1 * | 7/2009 | Wilkinson et al. | 297/378.12 |

* cited by examiner

Primary Examiner—Sarah B McPartlin
(74) Attorney, Agent, or Firm—Barnes & Thornburg LLP

(57) ABSTRACT

A juvenile vehicle seat includes a seat base adapted to set on a vehicle seat and a foldable backrest associated with the seat base. The juvenile vehicle seat also includes a backrest lock coupled to the foldable backrest.

26 Claims, 4 Drawing Sheets

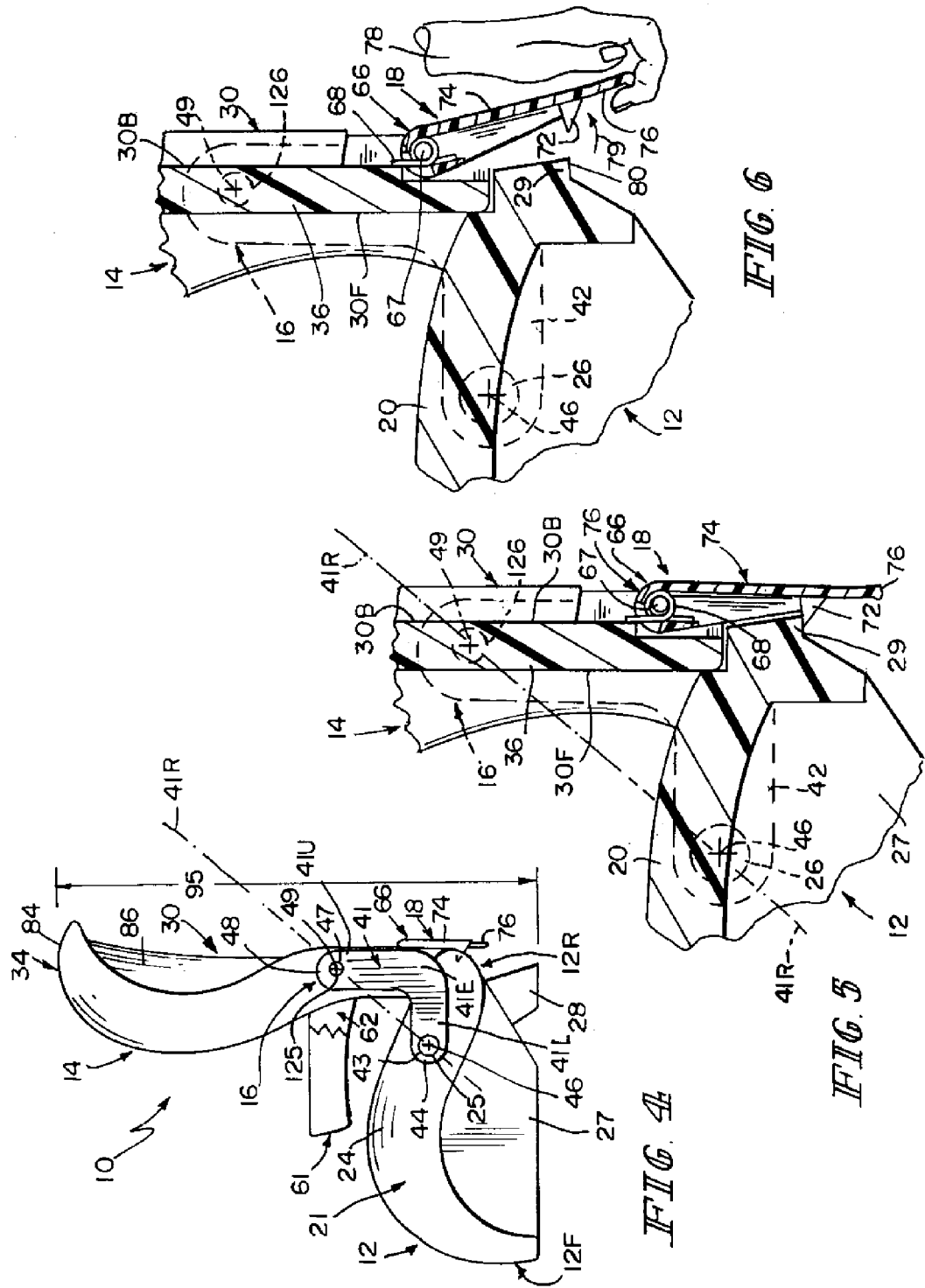

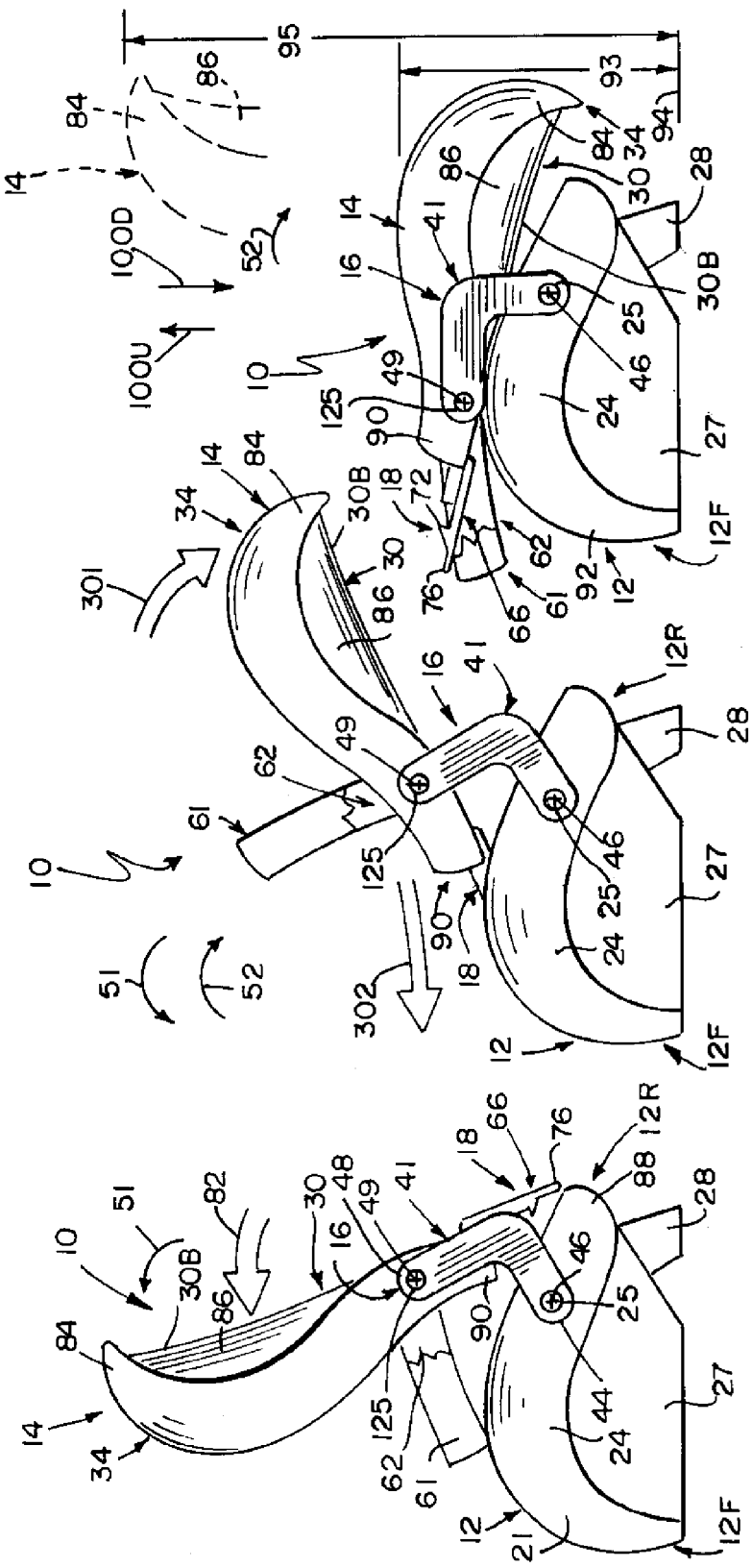

LOCK FOR FORWARD-FOLDING BACKREST

This application claims priority under 35 U.S.C. §119(e) to U.S. Provisional Application Ser. No. 60/894,616, filed on Mar. 13, 2007, which is expressly incorporated by reference herein.

BACKGROUND

The present disclosure relates to juvenile vehicle seats, and in particular to vehicle seats having backrests that move relative to seat bottoms. More particularly, the present disclosure relates to a foldable juvenile vehicle seat having a releasable backrest lock.

SUMMARY

A juvenile vehicle seat in accordance with the present disclosure includes a stationary seat base and a seat back including a foldable backrest and a backrest lock. The backrest lock is configured normally to lock the foldable backrest in an upright use position relative to the stationary seat base. The backrest lock can be operated by a caregiver so that the foldable backrest is released and free to move relative to the seat base to assume a compact folded storage position along a top surface of the seat base.

In illustrative embodiments, a compactible juvenile vehicle seat in accordance with the present disclosure includes a rearward pivoting and forward sliding backrest. When the backrest is moved to assume the compact folded storage position relative to the seat base, a back side of the backrest is arranged to face downwardly toward a seat bottom included in the seat base and a front side of the backrest is arranged to face upwardly away from the seat bottom.

In illustrative embodiments, after the backrest lock is released, the backrest is folded and moved relative to the seat base to cause a top edge of the foldable backrest to move toward a rear portion of the seat base and a bottom edge of the foldable backrest to move toward a front portion of the seat base. An illustrative seat back includes a backrest carrying the backrest lock and a headrest coupled to an upper portion of the backrest. An illustrative seat base includes a latch retainer configured to mate with and separate from a latch included in the backrest lock.

A backrest tether is provided to control movement of the foldable backrest relative to the seat base between the upright use position and the compact folded storage position. The backrest tether includes separate first and second tether links. In illustrative embodiments, each tether link is a rigid member shaped to resemble a hockey stick. Each tether link includes a lower end coupled to a pivot post included in the seat base and an upper end coupled to a pivot post included in the foldable backrest.

In illustrative embodiments, the backrest lock is carried on the foldable backrest and arranged to lie below and in spaced-apart relation to a headrest included in the seat back. The backrest lock includes a spring-loaded latch unit mounted for pivotable movement on a pivot bar coupled to the foldable backrest to engage and disengage a latch retainer included in the seat base.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 4 is a side elevation view of the juvenile vehicle seat of FIGS. 1-3 with a portion of the near arm removed to expose all of the first tether link shown in FIG. 1 and showing a portion of a movable anchor included in the backrest lock and located near a lower portion of the foldable backrest and a rearward portion of the stationary seat base;

FIG. 5 is an enlarged sectional view taken along line 5-5 of FIG. 1 showing use of a first return spring to yieldably bias the movable anchor (mounted for pivotable movement on a pivot bar coupled to the foldable backrest) to assume a locked position causing a latch included in the movable anchor to mate with a latch retainer included in the seat base;

FIG. 6 is a sectional view similar to FIG. 5 showing pivotable movement of the movable anchor by a caregiver about a pivot axis established by the pivot bar mounted on the foldable backrest in a counterclockwise direction against a yieldable biasing force generated by the first return spring to unmate the latch included in the movable anchor from a latch retainer included in the seat base to unlock the foldable backrest so that it is free to move to the compact folded storage position as suggested, for example, in FIGS. 7-9;

FIGS. 7-9 illustrate a folding sequence of the foldable backrest to show that, during folding, the backrest is moved to cause the top edge of the backrest to move toward the rear of the seat base while the bottom edge of the backrest moves toward the front of the seat base;

FIG. 7 is a side elevation view similar to FIG. 4 after the backrest lock has been released as suggested in FIGS. 5 and 6 showing counterclockwise pivoting movement of the foldable backrest and the first tether link as a unit about a lower pivot axis established by a first base pivot post included in the stationary seat base and coupled to a lower end of the first tether link;

FIG. 8 is a side elevation view similar to FIG. 7 showing counterclockwise pivoting movement of the foldable backrest relative to the first tether link about an upper pivot axis established by a first back pivot post included in the foldable backrest and coupled to an upper end of the first tether link; and FIG. 9 is a side elevation view similar to FIGS. 7 and 8 showing further pivoting movement of (1) the foldable backrest relative to the first tether link and (2) the first tether link relative to the seat base to cause the foldable backrest to assume a compact folded storage position relative to the seat base.

DETAILED DESCRIPTION

Figure 1:
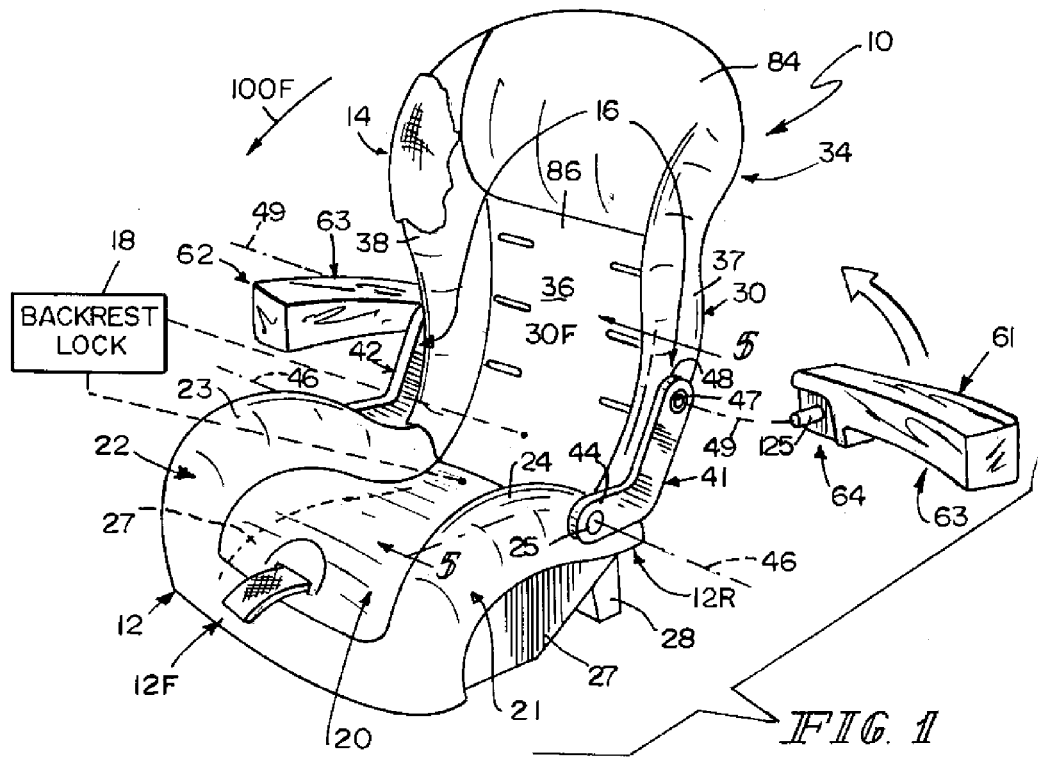
FIG. 1 is a perspective view of a juvenile vehicle seat in accordance with the present disclosure showing use of a releasable backrest lock to lock a foldable backrest in an upright use position relative to a stationary seat base and showing one of the optional arms removed from the foldable backrest to expose a first tether link shaped to resemble a hockey stick and included in a backrest tether configured to control folding movement of the foldable backrest relative to the seat base.
Figure 2:
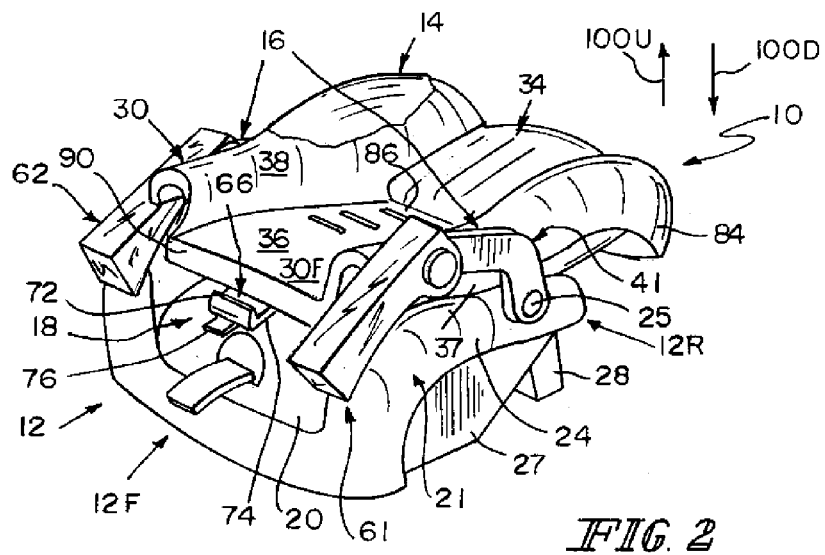
FIG. 2 is a perspective view similar to FIG. 1 after manual release of the backrest lock by a caregiver in a manner suggested, for example, in FIGS. 5 and 6, and movement of the foldable backrest relative to the seat base and constrained by the backrest tether to assume a folded storage position in a manner suggested, for example, in FIGS. 7-9.
Figure 3:
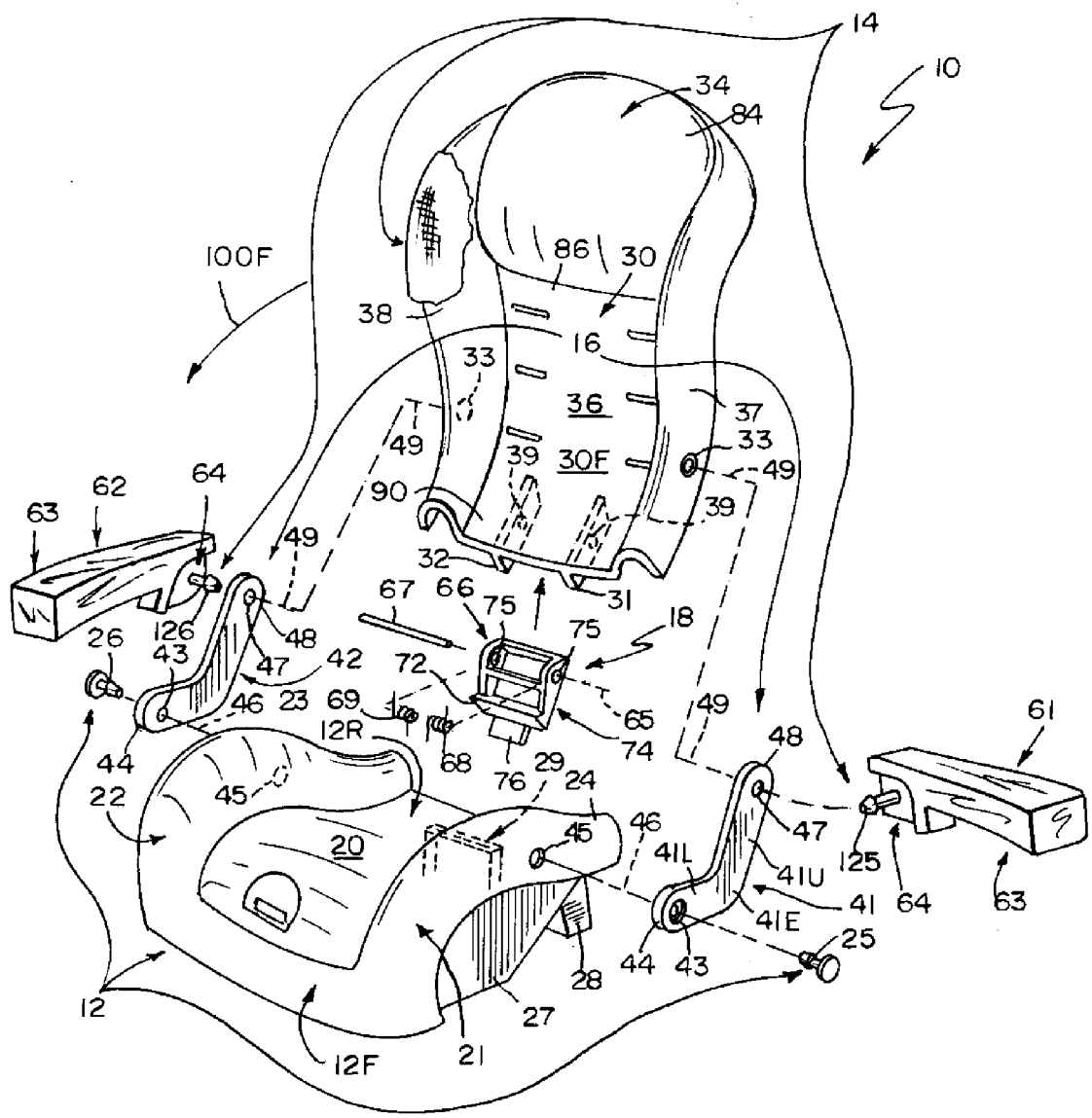
FIG. 3 is an exploded assembly view of the components included in the juvenile vehicle seat illustrated in FIGS. 1 and 2.

A juvenile vehicle seat 10 includes a seat base 12, a seat back 14 including a foldable backrest 30 and a backrest lock 18, and a backrest tether 16 as suggested, for example, in FIGS. 1 and 3. Backrest tether 16 is configured to control folding movement of foldable backrest 30 relative to stationary seat base 12 from an upright use position shown in FIG. 1 to a compact folded storage position shown in FIG. 2 in a manner shown, for example, in FIGS. 7-9. Backrest lock 18 is shown diagrammatically in FIG. 1 and can be used by a caregiver to release the normally locked backrest 30 in a manner suggested, for example, in FIGS. 5 and 6 to Free foldable backrest 30 for folding movement to the compact folded storage position.

Backrest tether 16 includes a first tether link 41 coupled to seat base 12 for pivotable movement about a lower pivot axis 46 and coupled to foldable backrest 30 for pivotable movement about an upper pivot axis 49 as suggested in FIGS. 1 and 3. In the illustrated embodiment, first tether link 41 is coupled to one side of seat base 12 and a similar tether link 42 is coupled to another side of seat base 12 also for pivotable movement about lower and upper pivot axes 46, 49 as suggested in FIG. 3.

Pivotable movement of foldable backrest 30 first about lower pivot axis 46 and then about upper pivot axis 49 during folding movement of foldable backrest 30 relative to stationary seat base 12 from the upright use position to the compact folded storage position is shown in a folding sequence illustrated, for example, in FIGS. 4, 7, 8, and 9. Operation of backrest lock 18 to release foldable backrest 30 for folding movement is shown, for example, in FIGS. 5 and 6.

Owing to the lower and upper pivot axes 46 and 49 established by tether links 41, 42, backrest 30 and first tether link 41 pivot, for example, as a unit in a counterclockwise direction 51 about lower pivot axis 46 during a first stage of folding movement as suggested in FIG. 7 and then, during a second stage of folding movement suggested in FIGS. 8 and 9, first tether link 41 continues to pivot in counterclockwise direction 51 about lower pivot axis 46 while backrest 30 pivots in a clockwise direction 52 about upper pivot axis 49 until backrest 30 is moved to assume the compact folded storage position shown in FIG. 9. It is within the scope of this disclosure to configure backrest tether 16 to cause foldable backrest 30 to move from the upright use position shown in FIG. 4 to assume the compact folded storage position shown in FIG. 9 by pivoting first tether link 41 in counterclockwise direction 51 about lower pivot axis 46 and pivoting foldable backrest 30 in clockwise direction 52 about upper pivot axis 46 without ever pivoting foldable backrest 30 about lower pivot axis 46 in counterclockwise direction 51.

In the upright use position, a front side 30F of foldable backrest 30 faces in a forward direction 100F as suggested in FIGS. 1 and 4 to cooperate with a seat bottom 20 included in seat base 12 to support a juvenile (not shown) seated in juvenile vehicle seat 10. In the compact folded storage position, front side 30F of foldable backrest 30 faces in an upward direction 100U away from seat bottom 20 and back side 30B of foldable backrest 30 faces in a downward direction 100D toward seat bottom 20 as suggested in FIGS. 2 and 9.

As shown best in FIG. 3, seat base 12 is formed to include a seat bottom 20 located between two spaced-apart thigh-support rims 21, 22. Each rim 21, 22 illustratively is arranged to support one of the thighs of a juvenile seated on seat bottom 20 and includes an inner wall 23 facing toward seat bottom 20 and an outer wall 24 facing away from seat bottom 20. It is within the scope of this disclosure to vary the height, width, and shape of rims 21, 22 as needed. Seat base 12 also includes a front portion 12F and a rear portion 12R as suggested in FIGS. 1-4 and 7-9.

As suggested in FIG. 3, seat base 12 also includes first and second base pivot posts 25, 26. First base pivot post 25 is coupled to outer wall 24 of first rim 21 to extend in a first direction away from seat bottom 20 (and along lower pivot axis 46). Second base pivot post 26 is coupled to outer wall 24 of second rim 22 to extend in an opposite second direction away from seat bottom 20 and along upper pivot axis 46.

Seat base 12 also includes two bottom support panels 27 arranged to underlie seat bottom 20 in spaced-apart relation to one another to provide support for seat bottom 20 and a rear kickstand 28 as suggested, for example, in FIGS. 3 and 4. A latch retainer 29 is provided on the underside of seat bottom 20 as suggested, for example, in FIGS. 3 and 5. Latch retainer 29 is located and configured to mate with backrest lock 18 to retain foldable backrest 30 in an upright use position as suggested, for example, in FIGS. 3, 4, and 5. It is within the scope of this disclosure to locate latch retainer 29 in another suitable location on seat base 12.

As shown best in FIG. 3, in an illustrative embodiment, seat back 14 includes a foldable backrest 30, first and second lock mounts 31, 32 coupled to a rear side of foldable backrest 30, and a headrest 34 coupled to an upper portion of backrest 30. Foldable backrest 30 includes a back support wall 36 located between spaced-apart first and second trunk-support rims 37, 38 in the illustrated embodiment. Each of first and second lock mounts 31, 32 is an elongated plate cantilevered to a rear surface on back side 30B of foldable backrest 30 and formed to include a bar-receiving aperture 39 as suggested, for example, in FIG. 3. Each trunk-support rim 37, 38 of foldable backrest 30 is formed to include a post receiver 33 as suggested in FIG. 3.

Foldable backrest 30 also includes a top edge 84, a bottom edge 90, and a middle portion 86 located between top and bottom edges 84, 90 as suggested in FIGS. 3 and 7-9. "Edge" as used herein means an outermost region of backrest 30.

As suggested in FIG. 3, backrest tether 16 includes separate first and second tether links 41, 42 in an illustrative embodiment. Tether links 41, 42 are coupled to seat base 12 and to seat back 14 and cooperate to provide means for supporting foldable backrest 30 for backward-pivoting and forward-sliding movement relative to stationary seat base 12 from the upright use position shown in FIG. 1 to the compact folded storage position shown in FIG. 2 in a manner shown, for example, in FIGS. 7-9 after backrest lock 18 is operated in a manner suggested in FIGS. 5 and 6 to free a normally locked backrest 30 for folding movement relative to seat base 12.

Each of tether links 41, 42 is shaped to resemble a hockey stick as shown, for example, in FIG. 3. In the illustrated embodiment, first base pivot post 25 passes through an aperture 43 formed in a lower end 44 of first tether link 41 and through an aperture 45 formed in outer wall 24 of first thigh-support rim 21 of seat base 12 to establish a lower pivot axis 46 as suggested in FIG. 3. Similarly, second base pivot post 26 passes through an aperture 43 formed in a lower end 44 of second tether link 42 and through an aperture 45 formed in outer wall 24 of second thigh support 22 of seat base 12 also to establish lower pivot axis 46. It is within the scope of this disclosure to form tether links 41, 42 as flexible members rather than rigid members and still retain the ability to guide foldable backrest 30 as it moves from an upright use position to a compact folded storage position on seat base 12.

In an illustrative embodiment, shown, for example, in FIG. 3, each of tether links 41, 42 is somewhat L-shaped. As suggested in FIGS. 3 and 4, first tether link 41 includes a lower segment 41L formed to include a first aperture 43, an upper segment 41U formed to include a second aperture 47, and an elbow segment 41E arranged to interconnect lower and upper segments 41L, 41U. It is with the scope of this disclosure to vary the measure of the included angle defined between lower and upper segments 41L, 41U.

The location of elbow segment 41E varies relative to seat base 12 during movement of foldable backrest 30 between the upright use position and the compact folded storage position as suggested in FIGS. 4 and 7-9. As suggested in FIG. 4, elbow segment 41E is arranged to lie in close proximity to a rear portion of seat base 12 upon movement of foldable backrest 30 to assume the upright use position. As suggested in FIG. 9, elbow segment 41E is arranged to lie about midway between rear and front portions of seat base 12 upon movement of foldable backrest 30 to assume the compact folded storage position. First tether link 41 is shaped to cause a reference line 41R arranged to intersect each of lower and upper pivot axes 46, 49 as shown in FIG. 5 to have a positive slope, as shown in FIG. 4, upon movement of foldable backrest 30 to assume the upright use position and to have a negative slope, as shown in FIG. 9, upon movement of foldable backrest 30 to assume the compact folded storage position.

In illustrative embodiments, seat back 14 also includes a first back pivot post 125 adapted to be coupled to foldable backrest 30 and to first tether link 41 and a second back pivot post 126 adapted to be coupled to foldable backrest 30 and to second tether link 42 as suggested in FIG. 3. In the illustrated embodiment, first back pivot post 125 passes through an aperture 47 formed in an upper end 48 of second tether link 41 and through aperture 33 formed in first trunk-support rim 37 of foldable backrest 30 to establish an upper pivot axis 49 as suggested in FIG. 3. Similarly, second back pivot post 126 passes through an aperture 47 formed in an upper end 48 of second tether link 42 and through aperture 33 formed in second trunk-support rim 38 of foldable backrest 30 also to establish upper pivot axis 49.

In use, as foldable backrest 30 moves back and forth between the upright use position shown in FIG. 1 and the compact folded storage position shown in FIG. 2, backrest 30 will pivot about first pivot axis 46 in a clockwise direction 51 as suggested in FIGS. 4 and 7-9 and will also pivot about second pivot axis 49 in a counterclockwise direction 52 as suggested in FIGS. 8 and 9. During this folding motion, backrest 30 pivots rearwardly in clockwise direction about second pivot axis 49 in response to a pushing force 301 applied by a caregiver and pivots and slides forwardly relative to seat base 12 in response to a pulling force 302 applied by a caregiver as suggested for example, in FIG. 8.

In illustrative embodiments, juvenile vehicle seat 10 also includes first and second arms 61, 62 as suggested in FIGS. 1 and 3. Each arm 61, 62 includes an armrest 63 and a post mount 64 coupled to an inner portion of a companion armrest 63 as suggested in FIG. 3. In the illustrated embodiment, first base pivot post 125 is coupled to post mount 64 of first arm 61 and cooperates with first arm 61 to form a monolithic component. Similarly, second base pivot post 126 is coupled to post mount 64 of second arm 62 and cooperates with second arm 62 to form another monolithic component. Use of arms 61, 62 is optional, and if arms 61, 62 are not used, then it is within the scope of this disclosure to reconfigure base pivot posts 125, 126 to resemble, for example, base pivot posts 25, 26 so as to couple upper ends 48 of first and second tether links 41, 42 to foldable backrest 30 to establish upper pivot axis 49. It is also within the scope of the present disclosure to form a monolithic seat base (not shown) made of a plastics material including both base pivot posts 25, 125 and to form a monolithic seat back (not shown) made of a plastics material including both back pivot posts 26, 126.

First arm 61 is arranged (as shown in FIG. 4) to lie in an elevated position raised above and in spaced-apart relation to first rim 21 and arranged to extend rearwardly from a point located about midway between front and rear portions 12F, 12R of seat base 12 toward rear portion 12R of seat base 12 upon movement of foldable backrest 30 to assume the upright use position. First arm 61 is arranged (as shown in FIGS. 2 and 9) to lie in a lowered position located below the raised position and in close proximity to first rim 21 and arranged to extend forwardly from a point located about midway between front and rear portions 12F, 12R of seat base 12 toward and past front portion 12F of seat base 12 upon movement of foldable backrest 30 to assume the compact folded storage position.

Illustrative components used to form backrest lock 18 are shown in FIG. 3. Backrest lock 18 includes a latch unit 66 configured to mate with and unmate from latch retainer 29 of seat base 12, a pivot bar 67, and first and second return springs 68, 69. Pivot bar 67 is coupled to first and second lock mounts 31, 32 on foldable backrest 30 and to latch unit 66 to support latch unit 66 for pivotable movement about pivot axis 65 as suggested in FIGS. 3, 5, and 6. As suggested in FIG. 3, one end of pivot bar 67 passes through aperture 39 formed in first lock mount 31 and another end of pivot bar 67 passes through aperture 39 formed in second lock mount 32. Latch unit 66 is located on pivot bar 67 in a pivoting position between first and second lock mounts 31, 32. It is within the scope of this disclosure to provide any suitable means for supporting latch unit 66 for movement relative to foldable backrest 30 between positions engaging and disengaging latch retainer 29 provided in seat base 12.

Latch unit 66 includes a latch 72 configured to mate with and unmate from latch retainer 29 of seat base 12. As shown in FIG. 3, latch unit 66 also includes a latch support 74 coupled to latch 72 and formed to include apertures 75 providing means for receiving pivot bar 67 to support latch 72 for pivotable movement between a locked position mated with latch retainer 29 as shown, for example, in FIGS. 4 and 5 and an unlocked position unmated from latch retainer 29 as shown, for example, in FIG. 6.

Return springs 68, 69 are coupled in any suitable manner to foldable backrest 30 and latch unit 66 to provide spring bias means for normally and yieldably urging latch unit 66 to move to the locked position in response to movement of foldable backrest 30 relative to seat base 12 to assume the upright use position as suggested in FIGS. 4 and 5. In an illustrative embodiment, each of return springs 68, 69 is a coiled torsion spring formed to include a central passageway configured to receive a portion of pivot bar 67 therein.

A grip handle 76 is also included in latch unit 66 as shown, for example, in FIG. 3. Grip handle 76 is cantilevered to latch support 74 to for example, locate latch 72 between grip handle 76 and apertures 75 formed in latch support 74 as shown best in FIG. 3. Grip handle 76 can be used by a caregiver 78 as suggested in FIG. 6 to pivot latch unit 66 in a counterclockwise direction 79 to disengage latch 72 from a downwardly facing latch-receiving surface 80 included in latch retainer 29 of seat base 12 and move latch unit 66 from the locked position shown in FIG. 5 to the unlocked position shown in FIG. 6. This releasing action frees foldable backrest 30 to be moved by caregiver 78 in the manner suggested in FIGS. 7-9 from the upright use position shown in FIGS. 1 and 4 to the compact folded storage position shown in FIGS. 2 and 9.

Juvenile vehicle seat 10 can be folded easily by a caregiver to assume a compact folded storage position as suggested in FIGS. 4-9. After backrest lock 18 has been released as suggested in FIGS. 5 and 6, foldable backrest 30 and backrest tether 16 (comprising, for example, first and second tether links 41, 42) are pivoted, for example, as a unit in counter-clockwise direction 51 about lower pivot axis 46 in response to a pushing force 82 applied by a caregiver and shown diagrammatically in FIG. 7. Lower pivot axis 46 is established, for example, by first and second base pivot posts 25, 26 included in seat base 12 and coupled to lower ends 44 of first and second tether links 41, 42.

During the next folding stage, foldable backrest 30 pivots in a clockwise direction 52 relative to backrest tether 16 about upper pivot axis 49 in response to, for example, a pushing force 301 and a pulling force 302 applied by a caregiver and shown diagrammatically in FIG. 8. This motion of foldable backrest 30 causes top edge 84 of foldable backrest 30 to move toward rear portion 12R of seat base 12 while bottom edge 90 of foldable backrest 30 moves toward front portion 12F of seat base 12. Upper pivot axis 49 is established, for example, by first and second back pivot posts 125, 126 included in seat back 14 and coupled to upper ends 48 of first and second tether links 41, 42.

As suggested in FIG. 9, once foldable backrest 30 is moved to assume the compact folded storage position it has a vertical height 93 (as measured from ground surface 94 underlying seat base 12) that is less than the vertical height 95 of foldable backrest 30 in the upright use position (shown in solid in FIG. 4 and in phantom in FIG. 9). A caregiver can fold backrest 30 easily to assume a compact position for storage or shipping when juvenile vehicle seat 10 is not in use.

The invention claimed is:

1. A compactible juvenile vehicle seat comprising
a seat base adapted to set on a vehicle seat and formed to include a seat bottom adapted to support a juvenile in a seated position, the seat base formed to include front and rear portions,
a seat back including a foldable backrest and a backrest lock, the foldable backrest including a front side adapted to face in a first direction toward a juvenile supported in the seated position upon movement of the foldable backrest relative to the seat base to assume an upright use position and a back side arranged to face in an opposite second direction, the foldable backrest also including a bottom edge located near the rear portion of the seat base upon movement of the foldable backrest to the upright use position and an opposite top edge, and
tether means for supporting the foldable backrest for movement relative to the seat base between the upright use position and a compact folded storage position to cause the top edge of the foldable backrest to move toward the rear portion of the seat base and the bottom edge of the foldable backrest to move toward the front portion of the seat base in response to movement of the foldable backrest relative to the seat base from the upright use position to assume the compact folded storage position, wherein the back side of the foldable backrest is arranged to face in a downward direction toward and overlie at least a portion of a seating surface of the seat bottom the seating surface being configured to receive the juvenile directly thereon and facing forward with the juvenile's back against the front side of the seatback when the seat is in the upright use position, and the front side of the foldable backrest is arranged to face in an upward direction away from the seat bottom upon arrival of the foldable backrest at the compact folded storage position.

2. The compactible juvenile vehicle seat of claim 1, wherein the tether means includes a first tether link coupled to the seat base for pivotable movement about a lower pivot axis and coupled to the foldable backrest for pivotable movement about an upper pivot axis.

3. The compactible juvenile vehicle seat of claim 2, wherein the first tether link is formed to include first and second apertures, the seat base includes first and second rims arranged to lie in spaced-apart relation to one another to locate the seat bottom therebetween, a first base pivot post coupled to the first rim to extend along the lower pivot axis in a direction away from the seat bottom and into the first aperture formed in the first tether link, and a first back pivot post coupled to a first trunk support rim to extend along the upper pivot axis in a direction away from the seat bottom and into the second aperture formed in the first tether link.

4. The compactible juvenile vehicle seat of claim 3, wherein the first tether link is L-shaped and includes a lower segment formed to include the first aperture, an upper segment formed to include the second aperture, and an elbow segment arranged to interconnect the lower and upper segments.

5. The compactible juvenile vehicle seat of claim 4, wherein the elbow segment is arranged to lie in close proximity to the rear portion of the seat base upon movement of the foldable backrest to assume the upright use position and to lie midway between the front and rear portions of the seat base upon movement of the foldable backrest to assume the compact folded storage position.

6. The compactible juvenile vehicle seat of claim 3, wherein the first tether link is shaped to cause a reference line arranged to intersect each of the lower and upper pivot axes and the first tether link is oriented to have a positive slope with the upper pivot axis being located above and to the right of the lower pivot axis upon movement of the foldable backrest to assume the upright use position and a negative slope with the upper pivot axis being located above and to the left of the lower pivot axis upon movement of the foldable backrest to assume the compact folded storage position.

7. The compactible juvenile vehicle seat of claim 3, further comprising a first arm and wherein the first arm includes an armrest and a post mount coupled to an inner portion of the armrest and to the first back pivot post.

8. The compactible juvenile vehicle seat of claim 7, wherein the first base pivot post and the first arm formed as a monolithic component.

9. The compactible juvenile vehicle seat of claim 7, wherein the first arm is arranged to lie in an elevated position raised above and in spaced-apart relation to the first rim and arranged to extend rearwardly from a point located about midway between the front and rear portions of the seat base toward the rear portion of the seat base upon movement of the foldable backrest to assume the upright use position and the first arm is arranged to lie in a lowered position located below the raised position and in close proximity to the first rim and arranged to extend forwardly from a point located about midway between the front and rear portions of the seat base toward the front portion of the seat base upon movement of the foldable backrest to assume the compact folded storage position.

10. The compactible juvenile vehicle seat of claim 2, wherein the first tether link is coupled to a first side of the seat base and of the foldable backrest and the tether means further includes a second tether link coupled to an opposite second side of the seat base and to the foldable backrest for pivotable movement about the lower and upper pivot axes.

11. The compactible juvenile vehicle seat of claim 10, further comprising separate first and second arms each coupled to the foldable backrest for pivotable movement about the upper pivot axis relative to the foldable backrest during movement of the foldable backrest between the upright use position and the compact folded storage position.

12. The compactible juvenile vehicle seat of claim 10, further comprising a backrest lock located in a space provided between the first and second tether links and configured to mate with a latch retainer included in the seat base to retain the foldable backrest in the upright use position upon movement of the foldable backrest relative to the seat base to assume the upright use position.

13. The compactible juvenile vehicle seat of claim 12, wherein the backrest lock includes a latch unit configured to mate with and unmate from the latch retainer, a pivot bar coupled to the foldable backrest to move therewith, and a return spring, the latch unit is mounted for pivotable movement on the pivot bar between a locked position mated with the latch retainer to retain the foldable backrest in the upright use position and an unlocked position unmated from the latch retainer to free the foldable backrest for movement from the upright use position to assume the compact folded storage position, and the return spring is configured to provide means for normally and yieldably urging the latch unit to move to the locked position in response to movement of the foldable backrest relative to the seat base to assume the upright use position.

14. A compactible juvenile vehicle seat comprising a seat base, a seat back including a foldable backrest and a backrest lock, and a backrest tether coupled to a first base pivot post included in the seat base to establish a lower pivot axis and to a first back pivot post included in the seat back to establish an upper pivot axis arranged to lie in spaced-apart relation to the lower pivot axis, wherein the backrest tether is configured to support the foldable backrest for movement relative to the seat base and about the lower and upper pivot axes from an upright use position to a compact folded storage position, wherein when the foldable backrest is moved from the upright use position to the compact folded storage position the seat back is separated from the seat base except for the support provided by the backrest tether, and wherein the foldable backrest includes a front side adapted to face in a first direction toward a juvenile supported in a seated position on a seat bottom included in the seat base upon movement of the foldable backrest to the upright use position and a back side arranged to face in a second direction opposite to the first direction and to face downwardly toward the seat bottom upon movement of the foldable backrest to the compact folded storage position.

15. The compactible juvenile vehicle seat of claim 14, wherein the backrest tether includes a first tether link coupled to the first base pivot post for pivotable movement about the lower pivot axis and coupled to the first back pivot post for pivotable movement about the upper pivot axis.

16. The compactible juvenile vehicle seat of claim 15, wherein the backrest tether further includes a second tether link coupled to a second base pivot post included in the seat base for pivotable movement about the lower pivot axis and to a second back pivot post included in the seat back for pivotable movement about the upper pivot axis.

17. The compactible juvenile vehicle seat of claim 16, wherein the seat base includes first and second rims arranged to lie in spaced-apart relation to one another and a seat bottom located between the first and second rims and adapted to support a juvenile in a seated position upon movement of the foldable backrest to assume the upright use position, the first base pivot post is coupled to the first rim, and the second base pivot post is coupled to the second rim.

18. The compactible juvenile vehicle seat of claim 15, wherein the first tether link is coupled to a first side of the seat base and of the foldable backrest and the second tether link is coupled to an opposite second side of the seat base and of the foldable backrest.

19. The compactible juvenile vehicle seat of claim 14, further comprising a first aim coupled to the first back pivot post for pivotable movement about the upper pivot axis during movement of the foldable backrest between the upright use position and the compact folded storage position.

20. The compactible juvenile vehicle seat of claim 14, wherein the first tether link is L-shaped and formed to include a first aperture receiving the first base pivot post therein and a second aperture receiving the first back pivot post therein.

21. A compactible juvenile vehicle seat comprising a seat base, a seat back including a foldable backrest and a backrest lock, and a backrest tether coupled to a first base pivot post included in the seat base to establish a lower pivot axis and to a first back pivot post included in the seat back to establish an upper pivot axis arranged to lie in spaced-apart relation to the lower pivot axis, wherein the backrest tether is configured to support the foldable backrest for movement relative to the seat base and about the lower and upper pivot axes from an upright use position to a compact folded storage position, wherein when the foldable backrest is moved from the upright use position to the compact folded storage position the seat back is separated from the seat base except for the support provided by the backrest tether, and, wherein the backrest tether is configured to provide means for supporting the foldable backrest for backward-pivoting and forward-sliding movement relative to the seat base from the upright use position to the compact folded storage position after the backrest lock is released to free normally locked foldable backrest for movement relative to the seat base.

22. A compactible juvenile vehicle seat comprising
a seat base adapted to set on a vehicle seat and formed to include a seat bottom adapted to support a juvenile in a seated position, the seat base formed to include front and rear portions,
a seat back including a foldable backrest and a backrest lock, the foldable backrest including a front side adapted to face in a first direction toward a juvenile supported in the seated position upon movement of the foldable backrest relative to the seat base to assume an upright use position and a back side arranged to face in an opposite second direction, the foldable backrest also including a bottom edge located near the rear portion of the seat base upon movement of the foldable backrest to the upright use position and an opposite top edge, and
tether means for supporting the foldable backrest for movement relative to the seat base between the upright use position and a compact folded storage position to cause the top edge of the foldable backrest to move toward the rear portion of the seat base and the bottom edge of the foldable backrest to move toward the front portion of the seat base in response to movement of the foldable backrest relative to the seat base from the upright use position to assume the compact folded storage position, wherein the back side of the foldable backrest is arranged to face in a downward direction toward the seat bottom and the front side of the foldable backrest is arranged to face in an upward direction away from the seat bottom upon arrival of the foldable backrest at the compact folded storage position;

wherein the tether means includes a first tether link coupled to the seat base for pivotable movement about a lower pivot axis and coupled to the foldable backrest for pivotable movement about an upper pivot axis;

wherein the first tether link is formed to include first and second apertures, the seat base includes first and second rims arranged to lie in spaced-apart relation to one another to locate the seat bottom therebetween, a first base pivot post coupled to the first rim to extend along the lower pivot axis in a direction away from the seat bottom and into the first aperture formed in the first tether link, and a first back pivot post coupled to a first trunk support rim to extend along the upper pivot axis in a direction away from the seat bottom and into the second aperture formed in the first tether link; and wherein the first tether link is L-shaped and includes a lower segment formed to include the first aperture, an upper segment formed to include the second aperture, and an elbow segment arranged to interconnect the lower and upper segments.

23. A compactible juvenile vehicle seat comprising a seat base adapted to set on a vehicle seat and formed to include a seat bottom adapted to support a juvenile in a seated position, the seat base formed to include front and rear portions, a seat back including a foldable backrest and a backrest lock, the foldable backrest including a front side adapted to face in a first direction toward a juvenile supported in the seated position upon movement of the foldable backrest relative to the seat base to assume an upright use position and a back side arranged to face in an opposite second direction, the foldable backrest also including a bottom edge located near the rear portion of the seat base upon movement of the foldable backrest to the upright use position and an opposite top edge, and tether means for supporting the foldable backrest for movement relative to the seat base between the upright use position and a compact folded storage position to cause the top edge of the foldable backrest to move toward the rear portion of the seat base and the bottom edge of the foldable backrest to move toward the front portion of the seat base in response to movement of the foldable backrest relative to the seat base from the upright use position to assume the compact folded storage position, wherein the back side of the foldable backrest is arranged to face in a downward direction toward the seat bottom and the front side of the foldable backrest is arranged to face in an upward direction away from the seat bottom upon arrival of the foldable backrest at the compact folded storage position;

wherein the tether means includes a first tether link coupled to the seat base for pivotable movement about a lower pivot axis and coupled to the foldable backrest for pivotable movement about an upper pivot axis;

wherein the first tether link is formed to include first and second apertures, the seat base includes first and second rims arranged to lie in spaced-apart relation to one another to locate the seat bottom therebetween, a first base pivot post coupled to the first rim to extend along the lower pivot axis in a direction away from the seat bottom and into the first aperture formed in the first tether link, and a first back pivot post coupled to a first trunk support rim to extend along the upper pivot axis in a direction away from the seat bottom and into the second aperture formed in the first tether link; and wherein the first tether link is shaped to cause a reference line arranged to intersect each of the lower and upper pivot axes and the first tether link is oriented to have a positive slope with the upper pivot axis being located above and to the right of the lower pivot axis upon movement of the foldable backrest to assume the upright use position and a negative slope with the upper pivot axis being located above and to the left of the lower pivot axis upon movement of the foldable backrest to assume the compact folded storage position.

24. A compactible juvenile vehicle seat comprising a seat base adapted to set on a vehicle seat and formed to include a seat bottom adapted to support a juvenile in a seated position, the seat base formed to include front and rear portions, a seat back including a foldable backrest and a backrest lock, the foldable backrest including a front side adapted to face in a first direction toward a juvenile supported in the seated position upon movement of the foldable backrest relative to the seat base to assume an upright use position and a back side arranged to face in an opposite second direction, the foldable backrest also including a bottom edge located near the rear portion of the seat base upon movement of the foldable backrest to the upright use position and an opposite top edge, and tether means for supporting the foldable backrest for movement relative to the seat base between the upright use position and a compact folded storage position to cause the top edge of the foldable backrest to move toward the rear portion of the seat base and the bottom edge of the foldable backrest to move toward the front portion of the seat base in response to movement of the foldable backrest relative to the seat base from the upright use position to assume the compact folded storage position, wherein the back side of the foldable backrest is arranged to face in a downward direction toward the seat bottom and the front side of the foldable backrest is arranged to face in an upward direction away from the seat bottom upon arrival of the foldable backrest at the compact folded storage position;

wherein the tether means includes a first tether link coupled to the seat base for pivotable movement about a lower pivot axis and coupled to the foldable backrest for pivotable movement about an upper pivot axis;

wherein the first tether link is formed to include first and second apertures, the seat base includes first and second rims arranged to lie in spaced-apart relation to one another to locate the seat bottom therebetween, a first base pivot post coupled to the first rim to extend along the lower pivot axis in a direction away from the seat bottom and into the first aperture formed in the first tether link, and a first back pivot post coupled to a first trunk support rim to extend along the upper pivot axis in a direction away from the seat bottom and into the second aperture formed in the first tether link;

further comprising a first arm and wherein the first arm includes an armrest and a post mount coupled to an inner portion of the armrest and to the first back pivot post; and wherein the first base pivot post and the first arm are formed as a monolithic component.

25. A compactible juvenile vehicle seat comprising a seat base adapted to set on a vehicle seat and formed to include a seat bottom adapted to support a juvenile in a seated position, the seat base formed to include front and rear portions, a seat back including a foldable backrest and a backrest lock, the foldable backrest including a front side adapted to face in a first direction toward a juvenile supported in the seated position upon movement of the foldable backrest relative to the seat base to assume an upright use position and a back side arranged to face in an opposite second direction, the foldable backrest also including a bottom edge located near the rear portion of the seat base upon movement of the foldable backrest to the upright use position and an opposite top edge, and tether means for supporting the foldable backrest for movement relative to the seat base between the upright use position and a compact folded storage position to cause the top edge of the foldable backrest to move toward the rear portion of the seat base and the bottom edge of the foldable backrest to move toward the front portion of the seat base in response to movement of the foldable backrest relative to the seat base from the upright use position to assume the compact folded storage position, wherein the back side of the foldable backrest is arranged to face in a downward direction toward the seat bottom and the front side of the foldable backrest is arranged to face in an upward direction away from the seat bottom upon arrival of the foldable backrest at the compact folded storage position;

wherein the tether means includes a first tether link coupled to the seat base for pivotable movement about a lower pivot axis and coupled to the foldable backrest for pivotable movement about an upper pivot axis;

wherein the first tether link is formed to include first and second apertures, the seat base includes first and second rims arranged to lie in spaced-apart relation to one another to locate the seat bottom therebetween, a first base pivot post coupled to the first rim to extend along the lower pivot axis in a direction away from the seat bottom and into the first aperture formed in the first tether link, and a first back pivot post coupled to a first trunk support rim to extend along the upper pivot axis in a direction away from the seat bottom and into the second aperture formed in the first tether link;

further comprising a first arm and wherein the first arm includes an armrest and a post mount coupled to an inner portion of the armrest and to the first back pivot post; and wherein the first arm is arranged to lie in an elevated position raised above and in spaced-apart relation to the first rim and arranged to extend rearwardly from a point located about midway between the front and rear portions of the seat base toward the rear portion of the seat base upon movement of the foldable backrest to assume the upright use position and the first arm is arranged to lie in a lowered position located below the raised position and in close proximity to the first rim and arranged to extend forwardly from a point located about midway between the front and rear portions of the seat base toward the front portion of the seat base upon movement of the foldable backrest to assume the compact folded storage position.

26. A compactible juvenile vehicle seat comprising a seat base adapted to set on a vehicle seat and formed to include a seat bottom adapted to support a juvenile in a seated position, the seat base formed to include front and rear portions, a seat back including a foldable backrest and a backrest lock, the foldable backrest including a front side adapted to face in a first direction toward a juvenile supported in the seated position upon movement of the foldable backrest relative to the seat base to assume an upright use position and a back side arranged to face in an opposite second direction, the foldable backrest also including a bottom edge located near the rear portion of the seat base upon movement of the foldable backrest to the upright use position and an opposite top edge, and tether means for supporting the foldable backrest for movement relative to the seat base between the upright use position and a compact folded storage position to cause the top edge of the foldable backrest to move toward the rear portion of the seat base and the bottom edge of the foldable backrest to move toward the front portion of the seat base in response to movement of the foldable backrest relative to the seat base from the upright use position to assume the compact folded storage position, wherein the back side of the foldable backrest is arranged to face in a downward direction toward the seat bottom and the front side of the foldable backrest is arranged to face in an upward direction away from the seat bottom upon arrival of the foldable backrest at the compact folded storage position;

wherein the tether means includes a first tether link coupled to the seat base for pivotable movement about a lower pivot axis and coupled to the foldable backrest for pivotable movement about an upper pivot axis;

wherein the first tether link is coupled to a first side of the seat base and of the foldable backrest and the tether means further includes a second tether link coupled to an opposite second side of the seat base and to the foldable backrest for pivotable movement about the lower and upper pivot axes;

further comprising a backrest lock located in a space provided between the first and second tether links and configured to mate with a latch retainer included in the seat base to retain the foldable backrest in the upright use position upon movement of the foldable backrest relative to the seat base to assume the upright use position; and wherein the backrest lock includes a latch unit configured to mate with and unmate from the latch retainer, a pivot bar coupled to the foldable backrest to move therewith, and a return spring, the latch unit is mounted for pivotable movement on the pivot bar between a locked position mated with the latch retainer to retain the foldable backrest in the upright use position and an unlocked position unmated from the latch retainer to free the foldable backrest for movement from the upright use position to assume the compact folded storage position, and the return spring is configured to provide means for normally and yieldably urging the latch unit to move to the locked position in response to movement of the foldable backrest relative to the seat base to assume the upright use position.

* * * * *